United States Patent
Albertson et al.

(10) Patent No.: US 10,396,944 B2
(45) Date of Patent: Aug. 27, 2019

(54) LOW LATENCY CORRUPT DATA TAGGING ON A CROSS-CHIP LINK

(71) Applicant: International Business Machines Corporation, Armonk, NY (US)

(72) Inventors: Chad M. Albertson, Rochester, MN (US); Eric J. Campbell, Rochester, MN (US); Nicholas J. Ollerich, Rochester, MN (US); Christopher W. Steffen, Rochester, MN (US); Curtis C. Wollbrink, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/708,488

(22) Filed: Sep. 19, 2017

(65) Prior Publication Data
US 2019/0089495 A1 Mar. 21, 2019

(51) Int. Cl.
*H04L 1/20* (2006.01)
*G06F 11/00* (2006.01)

(52) U.S. Cl.
CPC ............ *H04L 1/201* (2013.01); *G06F 11/006* (2013.01); *G06F 2201/805* (2013.01)

(58) Field of Classification Search
CPC .................................................. H04L 12/2697
USPC ........................................ 714/712, 707, 709
See application file for complete search history.

(56) References Cited

U.S. PATENT DOCUMENTS

| 9,306,863 | B2 | 4/2016 | Birrittella |
| 2009/0282301 | A1 | 11/2009 | Flynn et al. |
| 2010/0262882 | A1* | 10/2010 | Krishnamurthy ... G06F 11/1443 714/748 |
| 2013/0036337 | A1 | 2/2013 | Venkatasubramanian et al. |
| 2013/0103728 | A1* | 4/2013 | Chapweske .......... H04L 67/104 707/827 |
| 2014/0281790 | A1 | 9/2014 | Li et al. |

OTHER PUBLICATIONS

Olson, *Protecting Host Systems From Imperfect Hardware Accelerators*, <research.cs.wisc.edu/multifacet/theses/lena_olson_phd.pdf> (online), University of Wisconsin-Madison, published Aug. 17, 2016, 170 pages.

(Continued)

*Primary Examiner* — Fritz Alphonse
(74) *Attorney, Agent, or Firm* — Jason H. Sosa

(57) ABSTRACT

Low latency corrupt data tagging on a cross-chip link including receiving, from the cross-chip link, a control flit comprising a virtual channel identifier for an incoming data flit; storing the virtual channel identifier in a data pipeline and a bad data indicator (BDI) pipeline; receiving, from the cross-chip link, the incoming data flit into the data pipeline; moving, based on the virtual channel identifier in the data pipeline, the data flit from the data pipeline into an entry in a virtual channel queue corresponding to the virtual channel identifier; receiving, from the cross-chip link, a BDI for the data flit into the BDI pipeline; and moving, based on the virtual channel identifier in the BDI pipeline, the BDI for the data flit from the BDI pipeline into an entry in a BDI array corresponding to the entry in the virtual channel queue storing the data flit.

13 Claims, 5 Drawing Sheets

(56) References Cited

OTHER PUBLICATIONS

Stuecheli, *OpenCAPI™—A New Standard for High Performance Memory, Acceleration and Networks*, OpenCAPI (Open Coherent Accelerator Processor Interface), <http://opencapi.org/2017/04/opencapi-new-standard-high-performance-memory-acceleration-networks/> (online), dated Apr. 10, 2017, 17 pages.
P201701482US01, Appendix P; List of IBM Patents or Applications Treated as Related, Feb. 20, 2018, 2 pages.
Alberston et al., *Low Latency Corrupt Data Tagging on a Cross-Chip Link*, IBM, U.S. Appl. No. 15/822,954 IDS, filed Nov. 27, 2017, 23 pages.

* cited by examiner

LOW LATENCY CORRUPT DATA TAGGING ON A CROSS-CHIP LINK

BACKGROUND

Field of the Invention

The field of the invention is data processing, or, more specifically, methods, apparatus, and products for low latency corrupt data tagging on a cross-chip link.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for low latency corrupt data tagging on a cross-chip link are disclosed in this specification. Low latency corrupt data tagging on a cross-chip link includes receiving, from the cross-chip link, a control flit comprising a virtual channel identifier for an incoming data flit; storing the virtual channel identifier in a data pipeline and a bad data indicator (BDI) pipeline; receiving, from the cross-chip link, the incoming data flit into the data pipeline; moving, based on the virtual channel identifier in the data pipeline, the data flit from the data pipeline into an entry in a virtual channel queue corresponding to the virtual channel identifier; receiving, from the cross-chip link, a BDI for the data flit into the BDI pipeline; and moving, based on the virtual channel identifier in the BDI pipeline, the BDI for the data flit from the BDI pipeline into an entry in a BDI array corresponding to the entry in the virtual channel queue storing the data flit.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
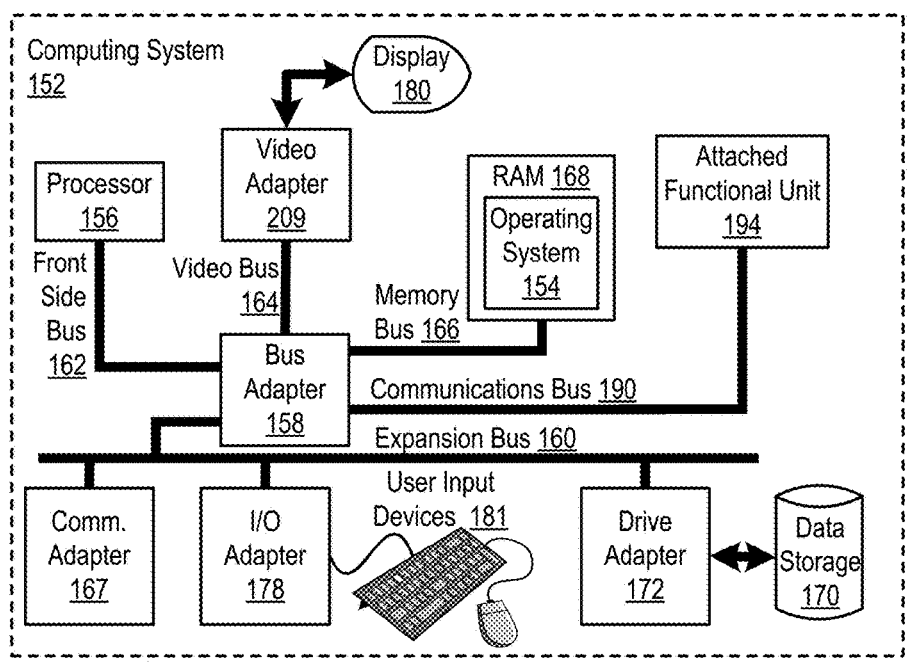
FIG. 1 sets forth a block diagram of an example system configured for low latency corrupt data tagging on a cross-chip link according to embodiments of the present invention.

Exemplary methods, apparatus, and products for direct memory access between an accelerator and a processor using a coherency adapter in accordance with the present invention are described with reference to the accompanying drawings, beginning with FIG. 1. FIG. 1 sets forth a block diagram of automated computing machinery comprising an exemplary computing system (152) configured for direct memory access between an accelerator and a processor using a coherency adapter according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for direct memory access between an accelerator and a processor using a coherency adapter according to embodiments of the present invention include UNIX™, Linux™, Microsoft XP™, AIX™, IBM's i5/OS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computers configured for direct memory access between an accelerator and a processor using a coherency adapter according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers (182) and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for direct memory access between an accelerator and a processor using a coherency adapter according to embodiments of the present invention include modems for wired dial-up communications, Ethernet (IEEE 802.3) adapters for wired data communications, and 802.11 adapters for wireless data communications.

The exemplary computing system (152) of FIG. 1 includes a communications bus (190) that connects the processor (156) and RAM (168) (via the bus adapter (158)) to the attached functional unit (194). The processor (156) may include an open coherent accelerator proxy interface facilitating communication with the attached functional unit (194) on a cross-chip link.

Figure 2:
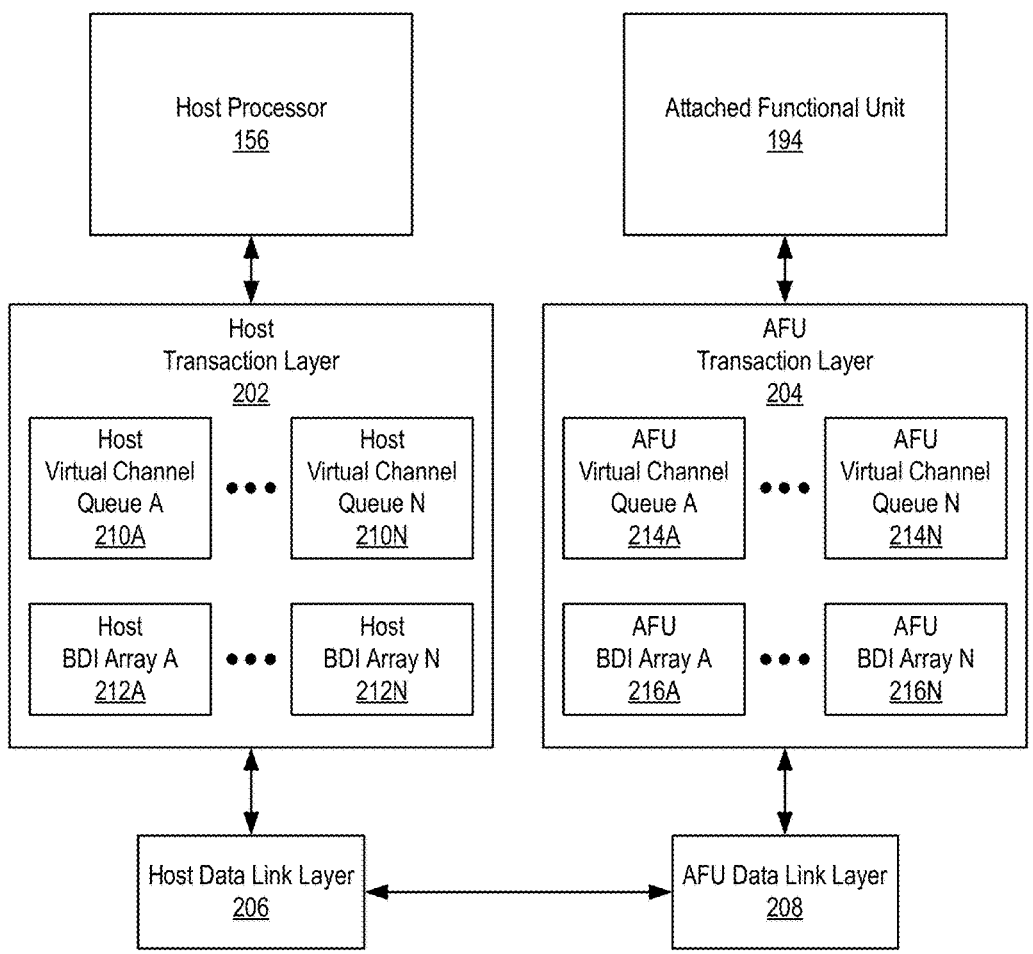
FIG. 2 sets forth a block diagram of an example system configured for low latency corrupt data tagging on a cross-chip link according to embodiments of the present invention.

FIG. 2 is an example block diagram of a system configured for low latency corrupt data tagging on a cross-chip link. FIG. 2 includes a host processor (156) coupled to an attached functional unit (AFU) (194) via a host transaction layer (202), a host data link layer (206), an AFU data link layer (208) and an AFU transaction layer (204). The host transaction layer (202) includes multiple host virtual channel queues (host virtual channel queue A (210A), host virtual channel queue N (210N)) each associated with a host bad data indicator (BDI) array (host BDI array A (212A), host BDI array N (212N)). The AFU transaction layer (204) includes multiple AFU virtual channel queues (AFU virtual channel queue A (214A), AFU virtual channel queue N (214N)) each associated with an AFU BDI array (AFU BDI array A (216A), AFU BDI array N (216N)).

The AFU (194) is a processing unit configured to extend the functionality of the computing system. The AFU (194) may be a removable component of the computing system installed to perform a specific task or group of tasks. The AFU (194) may be a field programmable gate array (FPGA). Example AFUs (194) include, for example, network interface cards, graphics accelerator cards, and storage adapter cards.

The host processor (156) and the AFU (194) exchange data using frames. A frame is a group of three types of flits—a control flit, one or more data flits, and a bookend flit. A flit, as the term is used in this specification, is a portion of a network packet. The control flit includes operation codes (opcodes) (e.g., read instructions, write instructions) and virtual channel (VC) identifiers for the incoming data flits. The control flit may also indicate the number and size of incoming data flits to be expected. The data flits include the data subject to the opcodes in the control flit. Further, the data flits may include only data, and may lack routing or descriptions of the data. The bookend flit includes bad data indicators (BDIs) (also referred to as poison bits) for any of the previously received data flits that are subject to a read or send error. The bookend flit also indicates that the frame has passed a cyclic redundancy check (CRC).

The BDIs received in the bookend flit indicate processor-sourced errors. Specifically, BDIs may indicate that an error has occurred in the reading of the data within the data flit and the data should not be used. The BDIs refer to data flit errors independent of transmission errors indicated by the CRC. The data and associated BDIs are received independent of one another. Specifically, the data may be received before, and in a separate flit from, the BDIs associated with the data.

The flits within the frames are received in order based on the control flit. For example, the transaction layer (host transaction layer (202), AFU transaction layer (204)) may receive a control flit indicating an amount of incoming data flits. The transaction layer (host transaction layer (202), AFU transaction layer (204)) then parses the control flit and prepares to receive the data flits indicated in the control flit. Following the control flit, the transaction layer (host transaction layer (202), AFU transaction layer (204)) receives the data flits referred to by the control flit. Once each of the incoming data flits referred to by the control flit have been received, the transaction layer (host transaction layer (202), AFU transaction layer (204)) receives the bookend flit. The transaction layer (host transaction layer (202), AFU transaction layer (204)) then parses the bookend flit and associates any BDIs in the bookend flit with previously-received data from the data flits.

The exchange of frames is performed by the transaction layers (host transaction layer (202), AFU transaction layer (204)) and the data link layers (host data link layer (206), AFU data link layer (208)). The data link layers (host data link layer (206), AFU data link layer (208)) are coupled to one another via a cross-chip link. The cross-chip link is a physical communication layer between the data link layers (host data link layer (206), AFU data link layer (208)) and represents the physical medium across which the frame is transmitted.

The data link layers (host data link layer (206), AFU data link layer (208)) receive the signals sent across the cross-chip link and provide those signals as flits to the transaction layers (host transaction layer (202), AFU transaction layer (204)). The transaction layer (host transaction layer (202), AFU transaction layer (204)) logic is hardware, software, or an aggregation of hardware and software that receives the frame as a set of flits from the data link layers (host data link layer (206), AFU data link layer (208)) and organizes the opcodes, data, and BDIs for consumption by the processing units (host processor (156), AFU (194)).

The virtual channel queues (host virtual channel queue A (210A), host virtual channel queue N (210N), AFU virtual channel queue A (214A), AFU virtual channel queue N (214N)) are used by the transaction layers (host transaction layer (202), AFU transaction layer (204)) to store the data received from the data link layer (host data link layer (206), AFU data link layer (208)). Specifically, the transaction layer (host transaction layer (202), AFU transaction layer (204)) selects the virtual channel queue based on the content of the control flit and places the associated data from the later-received data flit in the selected virtual channel queue. The virtual channel queues (host virtual channel queue A (210A), host virtual channel queue N (210N), AFU virtual channel queue A (214A), AFU virtual channel queue N (214N)) may be first-in-first-out (FIFO) queues presented to the processing units.

Each entry in the virtual channel queues (host virtual channel queue A (210A), host virtual channel queue N (210N), AFU virtual channel queue A (214A), AFU virtual channel queue N (214N)) may be associated with (i.e., parallel to) an entry in the BDI arrays (host BDI array A (212A), host BDI array N (212N), AFU BDI array A (216A), AFU BDI array N (216N)). The BDI arrays (host BDI array A (212A), host BDI array N (212N), AFU BDI array A (216A), AFU BDI array N (216N)) store BDIs for the data in the virtual channel queues (host virtual channel queue A (210A), host virtual channel queue N (210N), AFU virtual channel queue A (214A), AFU virtual channel queue N (214N)). Specifically, the transaction layers (host transaction layer (202), AFU transaction layer (204)) parse the bookend flit to extract the BDIs and select the destination BDI array entry associated (i.e. parallel to) the entry in the virtual queue storing the data to which the BDI applies. Associated entries in the virtual queues and BDI arrays are presented to the processing unit to be read together. Specifically, the processing units may read an entry in the virtual queue and the associated entry in the BDI array together such that the processing units receive the data and BDI in one procedure.

Figure 3:
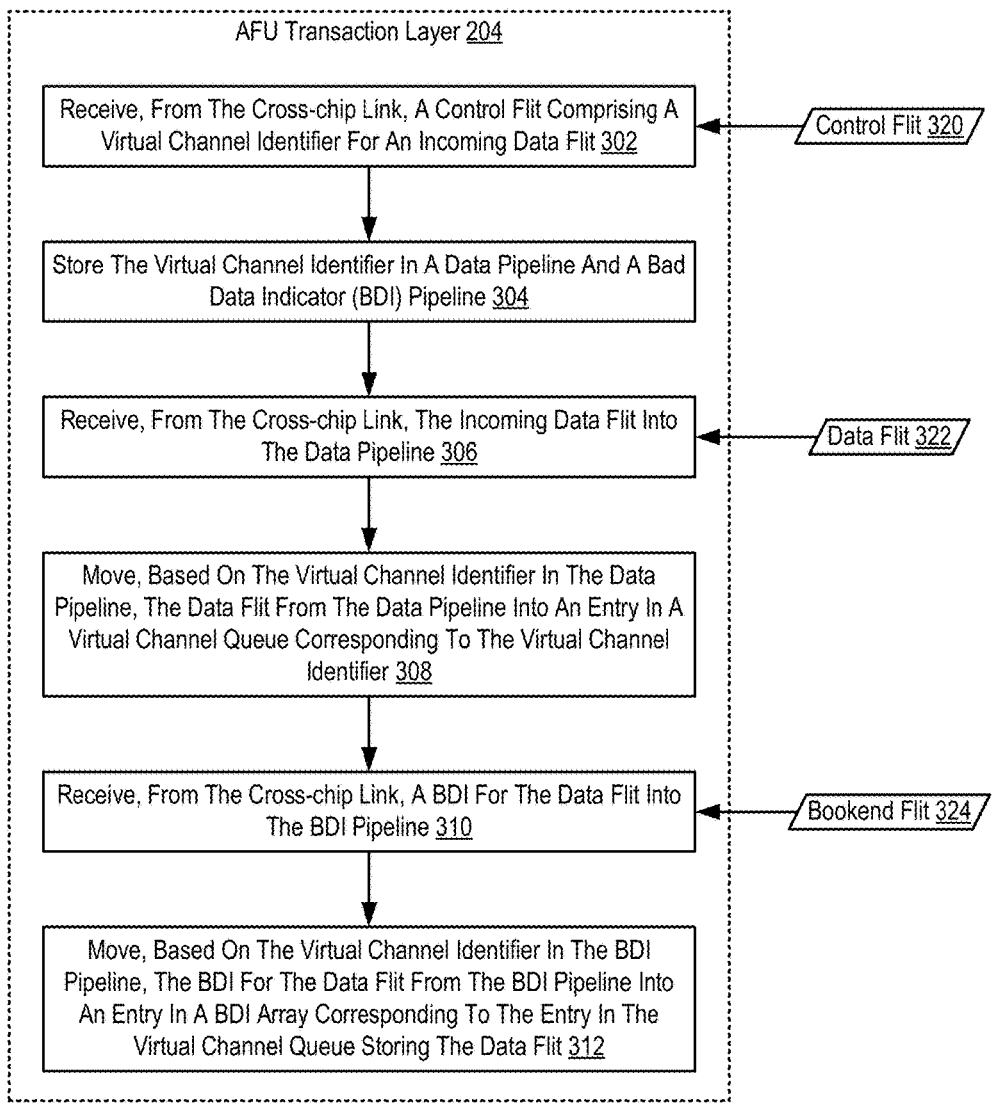
FIG. 3 sets forth a flow chart illustrating an exemplary method for low latency corrupt data tagging on a cross-chip link according to embodiments of the present invention.

For further explanation, FIG. 3 sets forth a flow chart illustrating an exemplary method for low latency corrupt data tagging on a cross-chip link according to embodiments of the present invention that includes receiving (302), from the cross-chip link, a control flit (320) comprising a virtual channel identifier for an incoming data flit. Receiving (302), from the cross-chip link, a control flit (320) comprising a virtual channel identifier for an incoming data flit may be carried out by receiving, by a transaction layer, the control flit (320) from a data link layer between the transaction layer and the cross-chip link. The control flit (320) may be received as the first flit of a frame from a host processing unit.

The method of FIG. 3 further includes storing (304) the virtual channel identifier in a data pipeline and a bad data indicator (BDI) pipeline. Storing (304) the virtual channel identifier in a data pipeline and a bad data indicator (BDI) pipeline may be carried out by parsing, by the transaction layer, the control flit (320) to extract the virtual channel identifier. The virtual channel identifier is then sent to the data pipeline and sent to the BDI pipeline.

The data pipeline is a staging area for the data in the incoming data flits. The data pipeline also stores the virtual channel identifier used to direct the data flit to the destination virtual channel. The data pipeline may be used to filter the data into the destination virtual channel using the virtual channel identifier.

The BDI pipeline is a staging area for the BDIs in the bookend flit. The BDI pipeline also stores the virtual channel identifier used to direct the BDIs to the destination entry in the BDI array that corresponds to the entry in the virtual channel queue storing (or that will store) the data to which the BDI applies.

The method of FIG. 3 further includes receiving (306), from the cross-chip link, the incoming data flit (322) into the data pipeline. Receiving (306), from the cross-chip link, the incoming data flit (322) into the data pipeline may be carried out by receiving, by the transaction layer, the data flit (322) from a data link layer. The data flit (322) may be received after the control flit (320) and before the bookend flit (324).

Multiple data flits (322) may be received in the frame. The control flit (320) may indicate that a plurality of data flits are incoming. Based on the control flit (320), the transaction layer may prepare the data pipeline for the plurality of data flits and virtual channel identifiers associated with each of the data flits. Preparing the data pipeline for the plurality of data flits and virtual channel identifiers may include using a data write pointer into the data pipeline to demarcate each incoming data flit received into the data pipeline. As each data flit is received into the data pipeline and associated with a virtual channel identifier, the data write pointer is advanced.

Storing (304) the virtual channel identifier in the data pipeline and the BDI pipeline may be performed after receiving (306), from the cross-chip link, the incoming data flit (322) into the data pipeline. Specifically, the transaction layer may not complete parsing the control flit (320) before the data flit (322) is received. The data flit (322) is received in the data pipeline and moving the data flit to a virtual queue will occur after the control flit (320) is parsed and the virtual channel identifier is stored in the data pipeline.

The method of FIG. 3 further includes moving (308), based on the virtual channel identifier in the data pipeline, the data flit (322) from the data pipeline into an entry in a virtual channel queue corresponding to the virtual channel identifier. Moving (308), based on the virtual channel identifier in the data pipeline, the data flit (322) from the data pipeline into an entry in a virtual channel queue corresponding to the virtual channel identifier may be carried out by the transaction layer in response to determining that the data pipeline has both the data flit and a virtual channel indicator for the data flit.

Moving (308), based on the virtual channel identifier in the data pipeline, the data flit (322) from the data pipeline into an entry in a virtual channel queue corresponding to the virtual channel identifier may also be carried out by determining, based on the virtual queue identifier in the data pipeline, the destination virtual channel and destination entry in the virtual channel. The transaction layer may select the virtual queue identified by the virtual queue identifier and target that virtual queue for moving the data flit (322).

The method of FIG. 3 further includes receiving (310), from the cross-chip link, a BDI for the data flit into the BDI pipeline. Receiving (310), from the cross-chip link, a BDI for the data flit into the BDI pipeline may be carried out by receiving, by a transaction layer, a bookend flit (324) that includes the BDI for the data flit from a data link layer. The bookend flit (324) may be received as the final flit of a frame from the host processing unit.

The bookend flit (324) may indicate that the transmission of the frame on the cross-chip link has been successful (i.e., a successful CRC has been completed). However, some data flits within the frame may be subject to other processor-sourced errors indicated by the BDIs. If any of the previously received data flits are subject to such errors, the bookend flit (324) may include a corresponding BDI. The transaction layer may then parse the bookend flit (324) and place the BDI in the BDI pipeline such that the BDI may be associated with the corresponding data flit.

The method of FIG. 3 further includes moving (312), based on the virtual channel identifier in the BDI pipeline, the BDI for the data flit from the BDI pipeline into an entry in a BDI array corresponding to the entry in the virtual channel queue storing the data flit. Moving (312), based on the virtual channel identifier in the BDI pipeline, the BDI for the data flit from the BDI pipeline into an entry in a BDI array corresponding to the entry in the virtual channel queue storing the data flit may be carried out by the transaction layer in response to determining that the BDI pipeline has both the BDI and a virtual channel indicator for the BDI.

Moving (312), based on the virtual channel identifier in the BDI pipeline, the BDI for the data flit from the BDI pipeline into an entry in a BDI array corresponding to the entry in the virtual channel queue storing the data flit may also be carried out by determining, based on the virtual queue identifier in the BDI pipeline, the destination BDI array and destination entry in the BDI array. The transaction layer may select the BDI array identified by the virtual queue identifier and target that BDI array for moving the data flit (322). The transaction layer may also determine an entry in the BDI array to place the BDI based on a write pointer in the BDI array.

Figure 4:
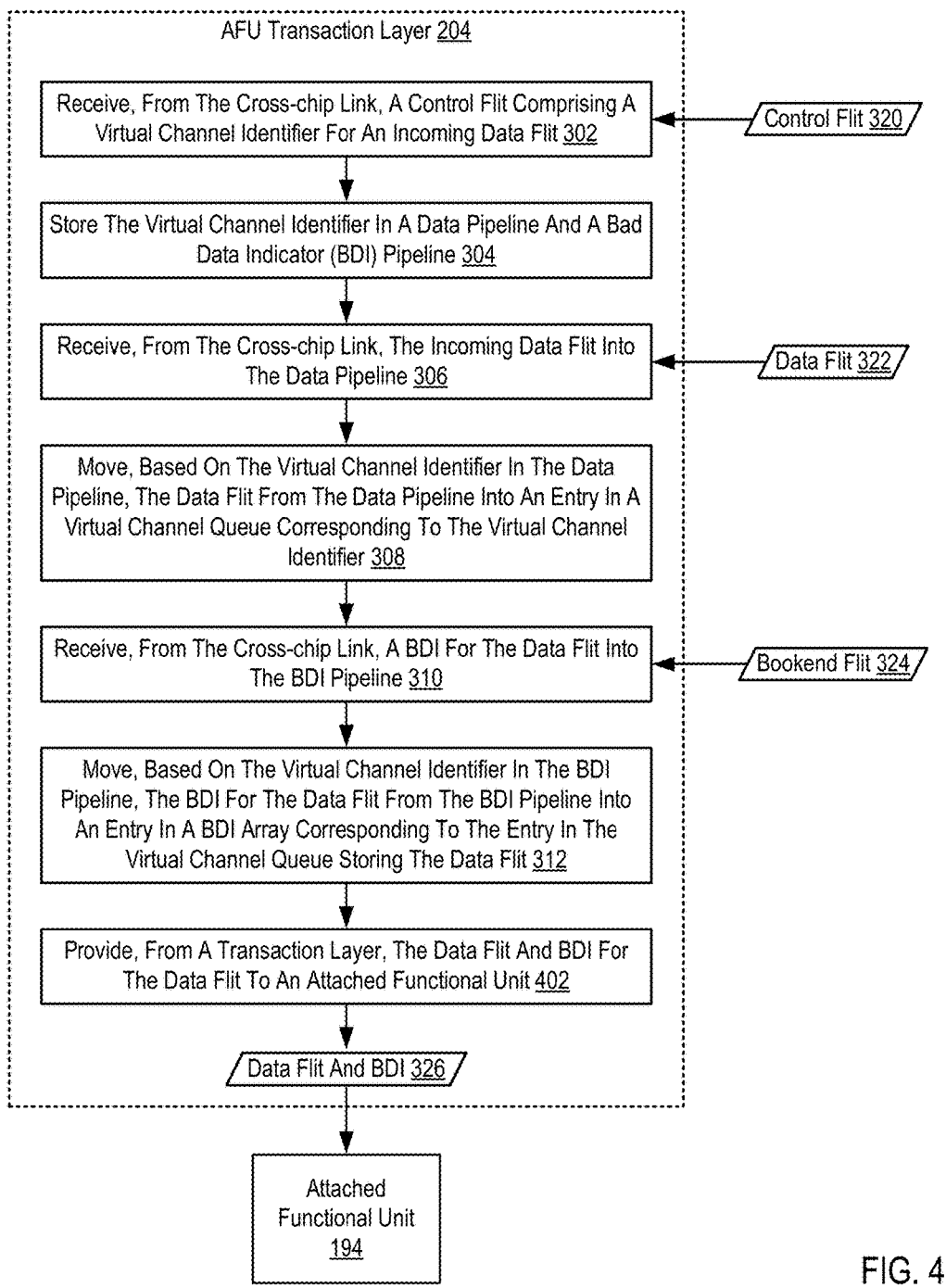
FIG. 4 sets forth a flow chart illustrating an exemplary method for low latency corrupt data tagging on a cross-chip link according to embodiments of the present invention.

For further explanation, FIG. 4 sets forth a flow chart illustrating a further exemplary method for low latency corrupt data tagging on a cross-chip link according to embodiments of the present invention that includes receiving (302), from the cross-chip link, a control flit (320) comprising a virtual channel identifier for an incoming data flit; storing (304) the virtual channel identifier in a data pipeline and a bad data indicator (BDI) pipeline; receiving (306), from the cross-chip link, the incoming data flit (322) into the data pipeline; moving (308), based on the virtual channel identifier in the data pipeline, the data flit (322) from the data pipeline into an entry in a virtual channel queue corresponding to the virtual channel identifier; receiving (310), from the cross-chip link, a BDI for the data flit into the BDI pipeline; and moving (312), based on the virtual channel identifier in the BDI pipeline, the BDI for the data flit from the BDI pipeline into an entry in a BDI array corresponding to the entry in the virtual channel queue storing the data flit.

The method of FIG. 4 differs from the method of FIG. 3, however, in that the method of FIG. 4 further includes providing (402), from a transaction layer, the data flit and BDI (326) for the data flit to an attached functional unit (194). Providing (402), from a transaction layer, the data flit and BDI (326) for the data flit to an attached functional unit (194) may be carried out by the transaction layer indicating to the AFU (194) that data is available in a virtual queue for transfer to the AFU for processing. The indication by the transaction layer may be the advancement of a write pointer in the virtual channel queue.

The virtual channel queue may include two write pointers. The first write pointer may indicate a portion of the virtual channel queue containing data that has received an associated bookend flit indicating a successful transmission of the frame on the cross-chip link (i.e., a successful CRC has been completed). The second write pointer may indicate a portion of the virtual channel queue containing data that has received all associated BDIs.

Figure 5:
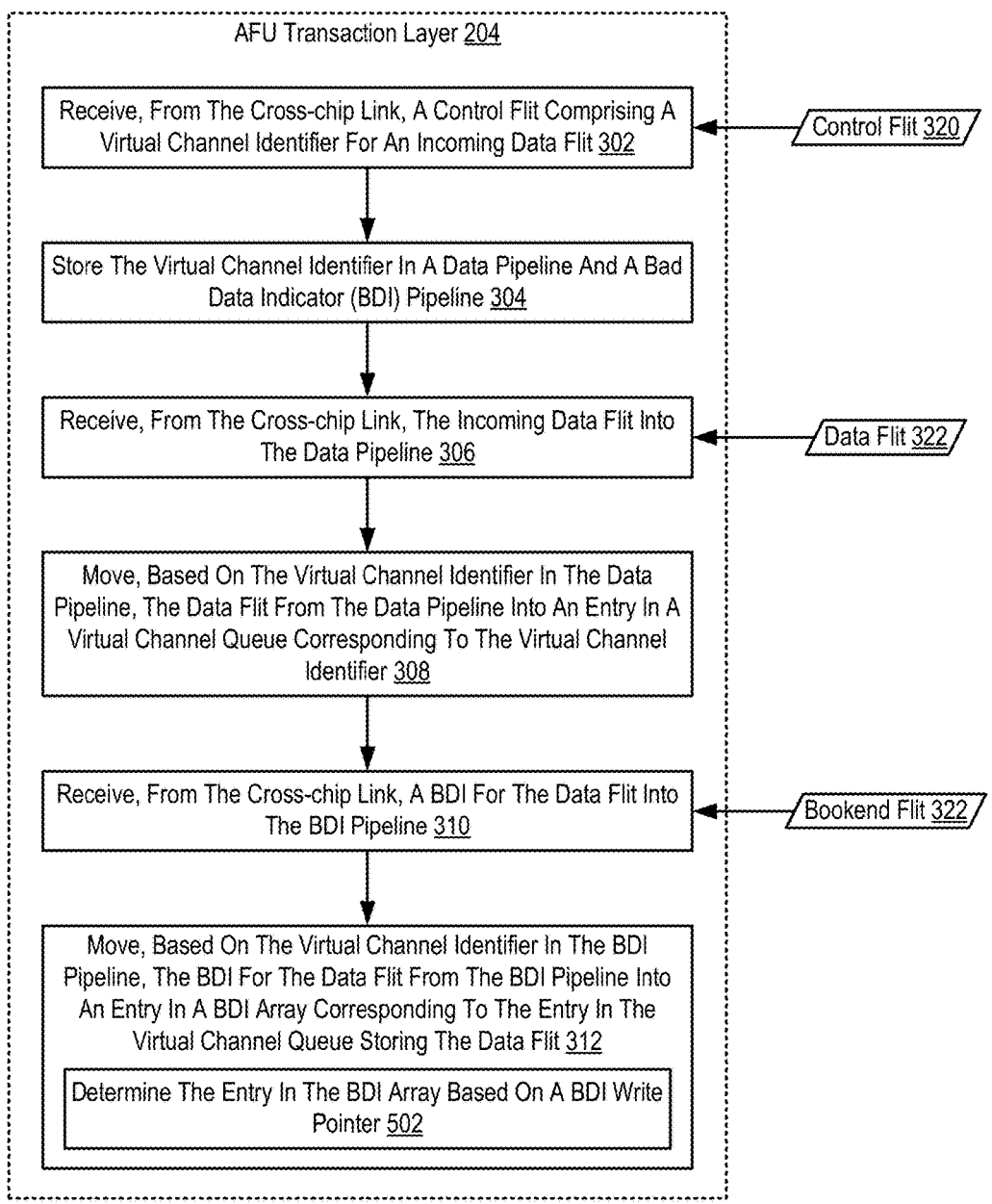
FIG. 5 sets forth a flow chart illustrating an exemplary method for low latency corrupt data tagging on a cross-chip link according to embodiments of the present invention.

For further explanation, FIG. 5 sets forth a flow chart illustrating a further exemplary method for low latency corrupt data tagging on a cross-chip link according to embodiments of the present invention that includes receiving (302), from the cross-chip link, a control flit (320) comprising a virtual channel identifier for an incoming data flit; storing (304) the virtual channel identifier in a data pipeline and a bad data indicator (BDI) pipeline; receiving (306), from the cross-chip link, the incoming data flit (322) into the data pipeline; moving (308), based on the virtual channel identifier in the data pipeline, the data flit (322) from the data pipeline into an entry in a virtual channel queue corresponding to the virtual channel identifier; receiving (310), from the cross-chip link, a BDI for the data flit into the BDI pipeline; and moving (312), based on the virtual channel identifier in the BDI pipeline, the BDI for the data flit from the BDI pipeline into an entry in a BDI array corresponding to the entry in the virtual channel queue storing the data flit.

The method of FIG. 5 differs from the method of FIG. 3, however, in that moving (312), based on the virtual channel identifier in the BDI pipeline, the BDI for the data flit from the BDI pipeline into an entry in a BDI array corresponding to the entry in the virtual channel queue storing the data flit includes determining (502) the entry in the BDI array based on a BDI write pointer. Determining (502) the entry in the BDI array based on a BDI write pointer may be carried out by determining the location of the BDI write pointer and placing the BDI in the entry in the BDI array corresponding to the BDI write pointer.

In view of the explanations set forth above, readers will recognize that the benefits of low latency corrupt data tagging on a cross-chip link according to embodiments of the present invention include:

Improving the operation of a computing system by continuously processing incoming data flits parallel to parsing other parts of the frame, decreasing latency for data transmission between processing units.

Improving the operation of a computing system by efficiently associating bad data indicators with corresponding previously received data flits, increasing transmission integrity between processing units.

Exemplary embodiments of the present invention are described largely in the context of a fully functional computer system for low latency corrupt data tagging on a cross-chip link. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for low latency corrupt data tagging on a cross-chip link, the apparatus comprising a computer processor, a computer memory operatively coupled to the computer processor, the computer memory having disposed within it computer program instructions that, when executed by the computer processor, cause the apparatus to carry out the steps of:
   receiving, from the cross-chip link, a control flit comprising a virtual channel identifier for an incoming data flit;
   storing the virtual channel identifier in a data pipeline and a bad data indicator (BDI) pipeline;
   receiving, from the cross-chip link, the incoming data flit into the data pipeline;
   moving, based on the virtual channel identifier in the data pipeline, the data flit from the data pipeline into an entry in a virtual channel queue corresponding to the virtual channel identifier;
   receiving, from the cross-chip link, a BDI for the data flit into the BDI pipeline; and
   moving, based on the virtual channel identifier in the BDI pipeline, the BDI for the data flit from the BDI pipeline into an entry in a BDI array corresponding to the entry in the virtual channel queue storing the data flit.

2. The apparatus of claim 1, wherein the computer program instructions, when executed by the computer processor, further cause the apparatus to carry out the steps of:

providing, from a transaction layer, the data flit and BDI for the data flit to an attached functional unit.

3. The apparatus of claim 1, wherein moving, based on the virtual channel identifier in the BDI pipeline, the BDI for the data flit from the BDI pipeline into an entry in a BDI array corresponding to the entry in the virtual channel queue storing the data flit comprises determining the entry in the BDI array based on a BDI write pointer.

4. The apparatus of claim 1, wherein storing the virtual channel identifier in the data pipeline and the bad data indicator (BDI) pipeline is performed after receiving, from the cross-chip link, the incoming data flit into the data pipeline.

5. The apparatus of claim 1, wherein each entry in to the virtual channel queue is associated with an entry in the BDI array.

6. The apparatus of claim 1, wherein the control flit further comprises an indication that a plurality of data flits are incoming, and wherein each incoming data flit is received into the data pipeline using a data write pointer.

7. The apparatus of claim 1, wherein the BDI for the data flit is received in a bookend flit, and wherein the bookend flit comprises a plurality of BDIs for a plurality of data flits.

8. A computer program product for low latency corrupt data tagging on a cross-chip link, the computer program product disposed upon a computer readable medium, the computer program product comprising computer program instructions that, when executed, cause a computer to carry out the steps of:
    receiving, from the cross-chip link, a control flit comprising a virtual channel identifier for an incoming data flit;
    storing the virtual channel identifier in a data pipeline and a bad data indicator (BDI) pipeline;
    receiving, from the cross-chip link, the incoming data flit into the data pipeline;
    moving, based on the virtual channel identifier in the data pipeline, the data flit from the data pipeline into an entry in a virtual channel queue corresponding to the virtual channel identifier;
    moving, based on the virtual channel identifier in the BDI pipeline, the BDI for the data flit from the BDI pipeline into an entry in a BDI array corresponding to the entry in the virtual channel queue storing the data flit.

9. The computer program product of claim 8, wherein the computer program instructions, when executed, cause the computer to further carry out the steps of:
    providing, from a transaction layer, the data flit and BDI for the data flit to an attached functional unit.

10. The computer program product of claim 8, wherein moving, based on the virtual channel identifier in the BDI pipeline, the BDI for the data flit from the BDI pipeline into an entry in a BDI array corresponding to the entry in the virtual channel queue storing the data flit comprises determining the entry in the BDI array based on a BDI write pointer.

11. The computer program product of claim 8, wherein storing the virtual channel identifier in the data pipeline and the bad data indicator (BDI) pipeline is performed after receiving, from the cross-chip link, the incoming data flit into the data pipeline.

12. The computer program product of claim 8, wherein each entry in to the virtual channel queue is associated with an entry in the BDI array.

13. The computer program product of claim 8, wherein the control flit further comprises an indication that a plurality of data flits are incoming, and wherein each incoming data flit is received into the data pipeline using a data write pointer.

* * * * *